US012281599B2

(12) United States Patent
Mondin et al.

(10) Patent No.: US 12,281,599 B2
(45) Date of Patent: Apr. 22, 2025

(54) STATOR PART OF A TURBOMACHINE COMPRISING A BLADE AND A FIN DEFINING BETWEEN THEM A DECREASING SURFACE FROM UPSTREAM TO DOWNSTREAM IN THE GAS FLOW DIRECTION

(71) Applicant: SAFRAN, Paris (FR)

(72) Inventors: Gabriel Jacques Victor Mondin, Moissy-Cramayel (FR); William Henri Joseph Riera, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/684,371

(22) PCT Filed: Aug. 11, 2022

(86) PCT No.: PCT/FR2022/051578
§ 371 (c)(1),
(2) Date: Feb. 16, 2024

(87) PCT Pub. No.: WO2023/021258
PCT Pub. Date: Feb. 23, 2023

(65) Prior Publication Data

US 2024/0218802 A1 Jul. 4, 2024

(30) Foreign Application Priority Data

Aug. 20, 2021 (FR) ...................................... 2108792

(51) Int. Cl.
*F01D 9/04* (2006.01)
*F01D 5/14* (2006.01)

(52) U.S. Cl.
CPC .......... *F01D 9/041* (2013.01); *F05D 2240/12* (2013.01)

(58) Field of Classification Search
CPC .......... F01D 5/146; F01D 9/041; F01D 5/145; F01D 9/02; F01D 5/143; F01D 5/141;
(Continued)

(56) References Cited

U.S. PATENT DOCUMENTS 8,257,036 B2 * 9/2012 Norris ........................ F02C 7/04
415/914
8,303,258 B2 * 11/2012 Aubin ................... F04D 29/681
416/193 A (Continued)

FOREIGN PATENT DOCUMENTS

EP 0 978 632 A1 2/2000
JP 52-54808 A 5/1977

OTHER PUBLICATIONS

Machine Translation of JP5254808, [May 1977]; [retrieved on Jun. 4, 2024]. Retrieved from: Japan Platform for Patent Information. (Year: 2024).*

(Continued)

*Primary Examiner* — Eric J Zamora Alvarez
(74) *Attorney, Agent, or Firm* — Sughrue Mion, PLLC

(57) ABSTRACT

A stator part of a turbomachine includes a platform, a blade, and a fin. The blade and the fin extend from the platform. The platform, an extrados of the blade and the fin define therebetween a gas flow channel. The channel has a section in a plane normal to an axis of the turbomachine, the section having a surface area, the surface area continuously decreasing from upstream to downstream with reference to a general gas flow direction through the turbomachine.

6 Claims, 2 Drawing Sheets

(58) Field of Classification Search
CPC .......... F01D 5/142; F01D 9/065; F01D 25/30; F01D 5/22; F01D 5/34; F01D 1/04; F01D 5/148; F01D 5/20; F01D 5/3007; F04D 29/544; F04D 29/681; F04D 29/324; F04D 29/321; F04D 29/68; F04D 29/667; F04D 29/666; F04D 29/644; F04D 29/541; F04D 29/522; F04D 29/547; F04D 29/545; F05D 2240/12; F05D 2220/32; F05D 2240/128; F05D 2240/30; F05D 2250/37; F05D 2260/961; F05D 2270/17; F05D 2220/30; F05D 2240/127; F05D 2240/129; F05D 2240/301; F05D 2240/305; F05D 2240/306; F05D 2240/80; F05D 2250/11; F05D 2250/184; F05D 2250/50; F05D 2250/73; F05D 2260/22141; F05D 2250/13
See application file for complete search history.

(56) References Cited

U.S. PATENT DOCUMENTS

| | | | | |
|---|---|---|---|---|
| 9,874,221 | B2 * | 1/2018 | DiPietro, Jr. | F04D 29/324 |
| 10,519,980 | B2 * | 12/2019 | Maniere | F04D 29/681 |
| 11,125,089 | B2 * | 9/2021 | Bertini | F01D 5/146 |
| 2007/0154314 | A1 * | 7/2007 | Jarrah | F04D 29/327<br>416/203 |
| 2014/0301852 | A1 * | 10/2014 | Zscherp | F04D 29/324<br>29/889.71 |
| 2017/0022835 | A1 * | 1/2017 | Clark | F01D 9/06 |
| 2018/0156124 | A1 | 6/2018 | Clements et al. | |
| 2018/0252231 | A1 * | 9/2018 | Northall | F02C 3/06 |

OTHER PUBLICATIONS

International Search Report dated Dec. 7, 2022 in Application No. PCT/FR2022/051578.
Preliminary Research Report dated May 2, 2022, issued in French Application No. 2108792.

* cited by examiner

[Fig. 1]
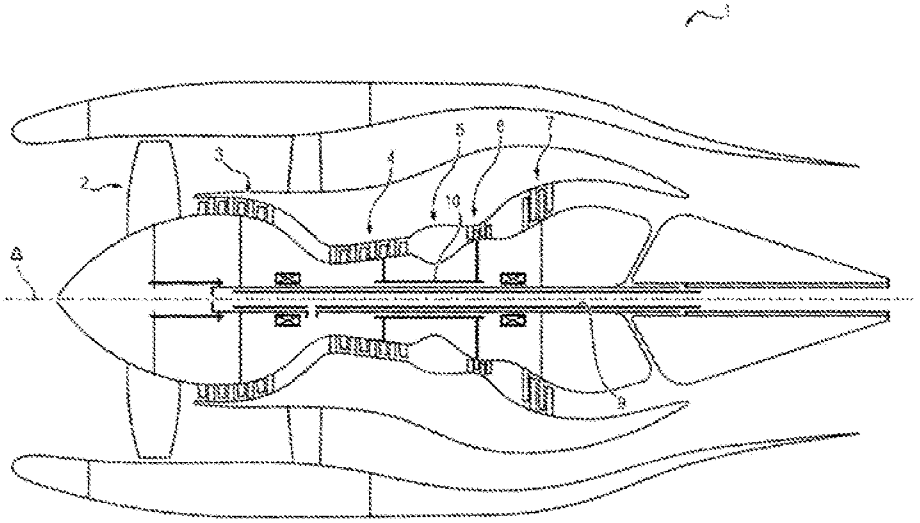
[Fig. 2]
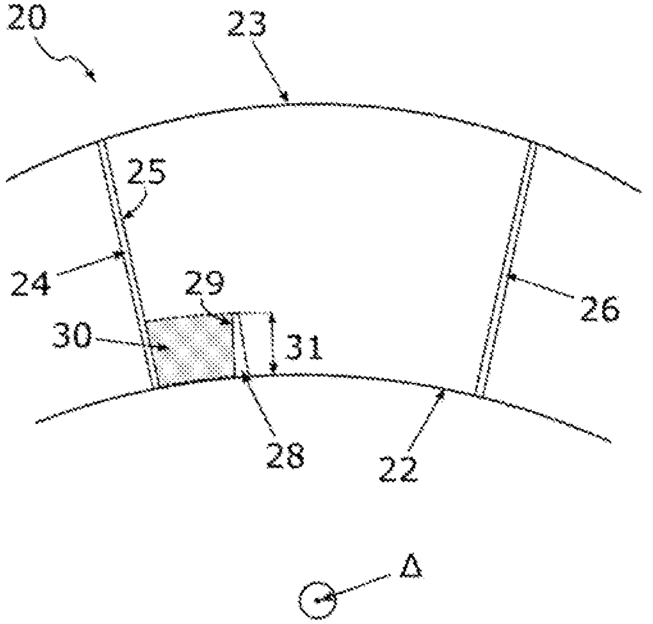

[Fig. 3]
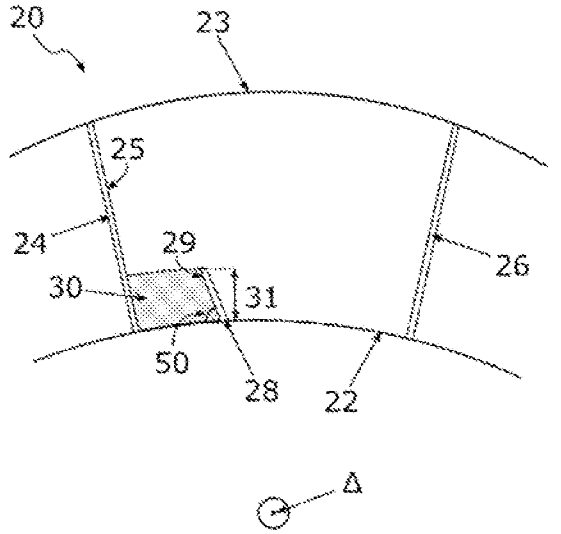
[Fig. 4]
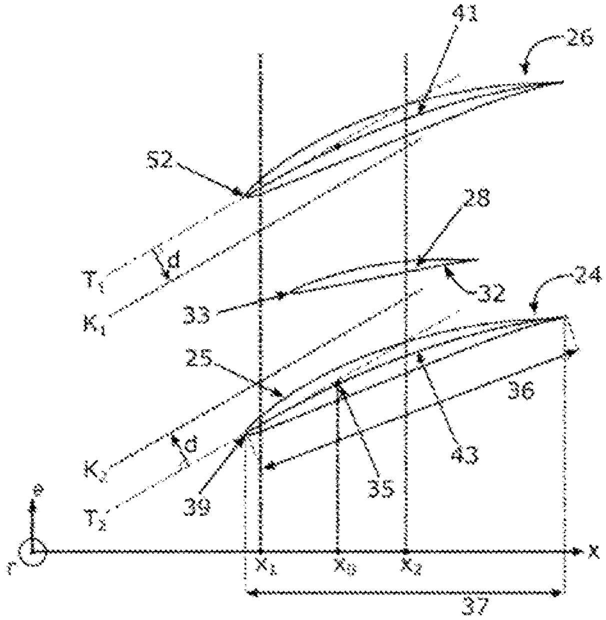

STATOR PART OF A TURBOMACHINE COMPRISING A BLADE AND A FIN DEFINING BETWEEN THEM A DECREASING SURFACE FROM UPSTREAM TO DOWNSTREAM IN THE GAS FLOW DIRECTION

CROSS REFERENCE TO RELATED APPLICATIONS

This application is a National Stage of International Application No. PCT/FR2022/051578 filed Aug. 11, 2022, claiming priority based on French Patent Application No. 2108792 filed Aug. 20, 2021, the contents of each of which being herein incorporated by reference in their entireties.

FIELD OF THE INVENTION

The invention relates to the stator parts of a turbomachine comprising a blade such as the guide vanes located downstream of a compressor and particularly the fixed-pitch guide vanes.

STATE OF THE ART

In an aircraft turbomachine, and particularly the aircrafts intended for the transport of passengers, it is the air propelled by a fan and combustion gases leaving the turbomachine through an exhaust nozzle that exerts a reaction thrust on the turbomachine and, through it, on the aircraft. The circulation of the gases through the turbomachine is influenced by rotating vane assemblies and fixed vane assemblies. The fixed vane assemblies or stator vane assemblies include in particular outlet guide vanes (or OGV), inlet guide vanes (or IGV), and variable pitch vanes (also known as Variable Stator Vane or VSV). Typically, the guide vanes of an aeronautical gas turbine engine each have two (internal and external) platforms which are added onto the vane assembly. These guide vanes form rows of fixed vanes which allow guiding the gas stream passing through the engine according to appropriate speed and angle.

Within a guide vane comprising a plurality of fixed blades, the flow of gases generally takes place between the blades along an upstream-downstream direction. It is known, however, that the area of the blade base can be the site of secondary aerodynamic flows.

For each pair of blades facing each other, a pressure gradient between the pressure face (intrados) of the first blade and the depression face (extrados) of the second blade generates a passage flow (also known under the term cross-flow) which transports the gases towards the extrados.

At the end of the blade, that is to say at the junction between the vane assembly and the hub or between the vane assembly and the casing, a corner separation and a corner vortex can occur. This separation generates pressure losses as well as aerodynamic blocking. The latter is problematic in terms of operability. For high incidences of the stream arriving on the guide vane, that is to say when the gas flow direction upstream of the guide vanemakes a significant angle with a direction of the leading edge of the blade, this corner separation increases to the point of causing a detachment of the boundary layer on the blade which can no longer ensure the deflection of the flow.

The reduction in the performances and operability of the compressors is all the greater as the ratio s/c between the circumferential distance separating two blades s and the chord of a blade c is large. For lightweight engines with a reduced number of blades and made more compact axially by shortened chords, this ratio s/c is greater, making the effects all the more problematic.

There is therefore a need for a new geometry for correcting these problems and improving the performances in terms of equipment efficiency, in particular at high incidence of the stream entering the guide vane.

DISCLOSURE OF THE INVENTION

One aim of the invention is to propose a stator part of a turbomachine whose geometry improves the flow of the fluids compared to the prior art.

The aim is achieved within the framework of the present invention thanks to a stator part of a turbomachine comprising a platform, a blade and a fin, the blade and the fin extending from the platform, the platform, an extrados of the blade and the fin defining therebetween a gas flow channel, the channel having a section in a plane normal to an axis of the turbomachine, having a surface area which continuously decreases from upstream to downstream with reference to a general gas flow direction through the turbomachine.

On the one hand, the proposed fin limits the passage flow which is directed towards the extrados. On the other hand, the fin defines between it and the extrados a channel in which the fluid flows. This channel has a section which decreases downstream so that the section seen by the fluid through this channel narrows. By preservation of the flow rate in the channel, the flow of the fluid accelerates downstream in the axial direction. There is therefore an acceleration of the stream on the extrados side, which reduces the thickness of the boundary layer on the extrados side of the blade as well as on the platform. This also reduces the area of low momentum associated with the corner separation responsible for the aerodynamic blocking. This is true over a wide range of incidence, and particularly at high incidences.

Such a stator part is advantageously and optionally supplemented by the following different characteristics taken alone or in combination:

- the extrados and the fin are separated in each normal plane by a distance decreasing from upstream to downstream;
- the fin has in each normal plane a ridge contiguous to the channel and presenting an inclination relative to the platform which decreases from upstream to downstream;
- the fin has a radial dimension which decreases from upstream to downstream;
- the fin comprises an upstream end, the blade has a maximum camber point and an axial chord defined as a length of a projection of a chord of the blade along the axis, the upstream end is located axially upstream of the camber point at a distance less than or equal to 30% of the axial chord and downstream of the camber point at a distance less than or equal to 20% of the axial chord; and
- the blade is a first blade, the stator part comprising a second blade facing the first blade, the fin being located between the first blade and the second blade, each blade comprising a leading edge and a tangent to a camber line of the blade at the leading edge, the tangents being parallel, for each tangent the upstream end of the fin being located in a plane normal to the tangents at a distance from the tangent greater than or equal to 5% of the axial chord.

The invention also relates to a turbomachine comprising a stator part as has just been presented and on an aircraft comprising such a turbomachine.

DESCRIPTION OF THE FIGURES

Other characteristics and advantages of the invention will emerge from the following description, which is purely illustrative and not limiting, and should be read in relation to the appended drawings in which:

FIG. 1 is a schematic representation of a turbomachine;

FIG. 2 is a schematic representation of a stator part according to a first embodiment;

FIG. 3 is a schematic sectional view in a plane perpendicular to the axis of the turbomachine of a stator part according to a second embodiment; and FIG. 4 is a schematic representation of a stator part according to the first embodiment in a vane-to-vane plane.

DETAILED DESCRIPTION OF THE INVENTION

With reference to FIG. 1, a turbomachine is represented schematically, more specifically an axial turbofan engine 1. The illustrated turbojet engine 1 extends along an axis Δ and successively includes, in the gas flow direction in the turbomachine, a fan 2, a compression section that can comprise a low-pressure compressor 3 and a high-pressure compressor 4, a combustion chamber 5, and a turbine section which can comprise a high-pressure turbine 6, a low-pressure turbine 7 and an exhaust nozzle.

The fan 2 and the low-pressure compressor 3 are driven in rotation by the low-pressure turbine 7 via a first transmission shaft 9, while the high-pressure compressor 4 is driven in rotation by the high-pressure turbine 6 via a second transmission shaft 10.

In operation, a flow of air compressed by the low-pressure and high-pressure compressors 3 and 4 supplies combustion in the combustion chamber 5, whose combustion gas expansion drives the high-pressure and low-pressure turbines 6, 7. The air propelled by the fan 2 and the combustion gases leaving the turbojet engine 1 through an exhaust nozzle downstream of the turbines 6, 7 exert a reaction thrust on the turbojet engine 1 and, through the latter, on a vehicle or machine such than an aircraft (not illustrated).

Downstream of the fan or of a compression stage, the turbomachine can comprise a stage of straightening vanes. Such a stage of straightening vanes can comprise a stator part 20 as presented with reference to FIG. 2.

The stator part 20, or the set 20 of stator parts if it is not in one piece, has at least two consecutive blades 24, 26 and a platform 22 from which the blades 24, 26 extend.

FIG. 2 is a schematic sectional representation of the stator part 20 in a plane normal to the axis Δ of the turbomachine, that is to say a schematic sectional view in a plane perpendicular to the axis of the turbomachine. The axis & is perpendicular to the plane of FIG. 2 and directed towards the reader of FIG. 2. The term “platform” here designates any element of the turbomachine from which blades 24, 26 are able to be mounted. The platform can be particularly a hub or a casing that surrounds the axis of the turbomachine. The platform can have a cylindrical surface at a constant radial distance in the axis Δ of the turbomachine. The blades 24, 26 extend from the platform 22 radially outwards or radially inwards. The platform 22 has an inner wall or an outer wall against which the air circulates. The stator part 20 comprises a wall 23 located facing the platform 22.

The blade 24 has an extrados 25 which faces a pressure face of the blade 26. In operation, the air flows through the stator part in a flowpath defined by the platform 22, the blades 24 and 26 and the wall 23. The flow takes place in the direction of the axis Δ of the turbomachine and from upstream to downstream along the direction of the axis Δ directed towards the reader in FIG. 2.

FIG. 4 is a schematic representation of the stator part 20 in a circumferential plane that is to say at a constant distance in the axis Δ of the turbomachine. The direction of the axis Δ is given in FIG. 4 by the axis x whose orientation is the gas flow direction. The radial axis r is perpendicular to the plane of FIG. 4 and directed towards the reader of FIG. 4. The axis θ corresponds to the circumferential direction perpendicular simultaneously to the axis Δ and the radial axis.

The blades 24 and 26 each have a pressure face and an extrados. The blades 24 and 26 each comprise a leading edge 52, 39 on the upstream side and a trailing edge on the downstream side. The blades define a chord 36 which is the segment connecting the leading edge and the trailing edge. The chord 36 projected on the direction of the axis of the turbomachine defines an axial chord 37.

Each blade has a camber line 41, 43 which is the curve equal to the average between the curve of the extrados and the curve of the pressure face. More specifically, the camber line is formed by all the points located equidistant from the extrados and the pressure face. The distance from a particular point in the extrados (or the pressure face) is defined here as the minimum distance between the particular point and a point in the extrados (or the pressure face).

On each camber line 41, 43, a maximum camber point is defined (reference 35 on the blade 24). At this point, the length of a segment perpendicular to the chord line and connecting a point of the chord line and a point of the camber line is maximum.

The coordinate of the maximum camber point along the axis x is denoted x0 in FIG. 4.

There is also defined:

- a coordinate x1 smaller than the coordinate x0, the length x0-x1 worth 30% of the axial chord 37;
- a coordinate x2 greater than the coordinate x0, the length x2-x0 worth 20% of the axial chord 37.

The stator part 20 also comprises a fin 28 which extends from the platform in the same direction and the same direction of extension as the blades 24, 26. The fin is located between the blades 24 and 26. The fin extends over a radial dimension 31 smaller than a height of the blades. In other words, the fin does not extend from the platform 22 to the wall 23 over the entire height of the flowpath separating the platform 22 from the wall 23. The radial dimension 31 of the fin 28 varies between 1% and 40% of this flowpath height. The radial dimension 31 depends on the size of an upstream boundary layer.

The fin 28 extends along the axis Δ of the turbomachine from an upstream end 33 to a downstream end, as illustrated in FIG. 4.

The fin 28 has a flank 32 which is located facing the extrados 25 of the blade 24. The intersection of the flank 32 and of a plane normal to the axis Δ of the turbomachine is a ridge 29. This ridge can be straight or curved.

The flank 32 of the fin 28 may have a rectilinear ridge 29 which makes it possible to define an inclination 50 with the platform 22, as represented in FIG. 3. This inclination is equal to 90° when the ridge makes a right angle with the platform. When the platform 22 comprises a cylindrical surface at a constant radial distance in the axis Δ of the turbomachine, a 90° inclination of the ridge 29 corresponds to a ridge which extends along the radial direction.

The platform 22, the extrados 25 of the blade 24 and the fin 28 define therebetween a gas flow channel 30. The channel 30 extends from the extrados 25 to the flank 32 of the fin 28 along the circumferential direction θ. The ridge 29 of the flank 32 of the fin 28 is contiguous to the channel 30. The channel 30 extends radially from the platform 22 to the wall 23 over a length equal to the radial dimension 31 of the fin 28.

The channel 30 follows the shapes of the platform 22, the extrados 25 and the flank of the fin 28. The channel 30 does not extend beyond the radial dimension 31 of the fin 28.

The stator part is configured so that the channel 30 has a section, in a plane normal to the axis Δ of the turbomachine, whose surface area decreases continuously from upstream to downstream.

In other words, if two planes normal to the axis Δ of the turbomachine are chosen, the two planes comprising a downstream plane and an upstream plane upstream of the downstream plane, the section of the channel 30 in the upstream plane is always greater than or equal to the section of the channel 30 in the downstream plane.

The continuous decrease in the surface area of the section can be obtained in different embodiments which can possibly be combined with each other.

In a first embodiment, the extrados 25 and the flank 32 of the fin 28 are separated in each normal plane by a distance which decreases from upstream to downstream. In this case, the radial dimension 31 of the constant fin can be kept constant and the shape of the ridge 39 can be kept identical in the different normal planes.

In a second embodiment, the inclination 50 of the ridge 29 relative to the platform 22 decreases from upstream to downstream. The flank of the fin 28 is then oblique and the angle of the flank relative to the platform 22 decreases downstream.

In a third embodiment, the radial dimension 31 of the fin decreases from upstream to downstream. In this case, the distance separating the extrados 25 and the flank 32 can be kept constant and the shape of the ridge 39 can be kept identical in the different normal planes. The second embodiment and the third embodiment can be advantageously combined: the fin decreases in radial dimension downstream and the inclination of the ridge decreases downstream.

Thanks to the reduction in the section of the channel 30 from upstream to downstream, the area where the gas flow presented in the prior art a small momentum is accelerated in the stator part presented here.

Furthermore, as the channel size decreases, the blocking induced by the channel also decreases.

The boundary layer remains attached longer on the extrados 25 of the blade 24, which improves the straightening efficiency of the latter. This effect is significant at high incidence, where the corner separation is usually significant. By limiting the separations and losses of the stator, the flow is better deflected. This makes it possible to limit the deviation between the gas stream and the profile of the straightening vanes at the stator outlet.

The efficiency of the propulsion assembly formed of the rotor and of the stator is improved. This effect is visible even at low incidence, close to the maximum efficiency point for heavily loaded stators—that is to say for stator guide vanes whose ratio s/c is high.

It is thus possible to have a more robust stator, which can increase the operating margin of the compressor.

Optionally to the embodiments previously presented, the upstream end 33 of the fin 28 can be placed in specific areas according to two conditions.

A first condition is that the upstream end 33 can be located axially, that is to say along the direction of the axis Δ of the turbomachine, upstream of the camber point 35 at a distance less than or equal to 30% of the axial chord 37 and downstream of the camber point 35 at a distance less than or equal to 20% of the axial chord 37.

In other words, the upstream end 33 is located between the straight lines of equation x=x1 and x=x2, with the coordinates x1 and x2 introduced previously. The straight lines x=x1 and x=x2 are represented in dotted lines in FIG. 4.

In addition to this first condition, the upstream end 33 can be located, according to a second condition, at particular distances from the tangents of the camber lines 41, 43 of the blades 24, 26. More specifically, the tangent T1 to the camber line 41 of the blade 26 is defined at its leading edge 52, and the tangent T2 to the camber line 43 of the blade 24 is defined at its leading ridge 39.

These two tangents T1 and T2 are parallel and a plane simultaneously normal to the two tangents T1, T2 can be defined. According to the second condition, the upstream end 33 is located at a distance from each of the tangents greater than or equal to 5% of the axial chord 37.

FIG. 4 illustrates a distance d equal to 5% of the axial chord 37. The straight lines K1, K2 are parallel to the tangents T1, T2. The straight line K1 is at a distance d from the tangent T1, the straight line K1 being closer to the blade 24. The straight line K2 is at a distance d from the tangent T2, the straight line K2 being closer to the blade 26.

The straight lines K1 and K2 define an area therebetween and if the upstream end 33 of the fin 28 is in this area, the second condition is met.

Furthermore, the axial position of the downstream end of the fin can be the axial position of the trailing edge of the blades 24, 26.

The two conditions make it possible to optimize the position of the fin as a function of the maximum curvature area of the blades and to optimize the effect of controlling the separation on the downstream portion of the blade 24, while reducing the disadvantages of the addition of a fin.

The invention claimed is:

1. A stator part of a turbomachine comprising:
- a platform,
- a blade, and
- a fin,
- the fin comprising an upstream end and a downstream end, with reference to a general gas flow direction through the turbomachine,
- the blade and the fin extending from the platform,
- the platform, an extrados of the blade and the fin defining therebetween a gas flow channel,
- the channel having a section in a plane normal to an axis of the turbomachine, the section having a surface area, the surface area continuously and monotonously decreasing from the upstream end to the downstream end,
- wherein the fin comprises a ridge in a plane normal to the axis of the turbomachine, the ridge being contiguous to the channel, the ridge presenting an inclination relative to the platform, the inclination decreasing from upstream to downstream.

2. The stator part according to claim 1, wherein the fin has a radial dimension with respect to the axis of the turbomachine, the radial dimension decreasing from upstream to downstream.

3. The stator part according to claim 1, wherein:

the fin comprises the upstream end, the blade has a maximum camber point and an axial chord, the axial chord being defined as a length of a projection of a chord of the blade along the axis, the upstream end being located axially upstream or downstream of the maximum camber point so that when the upstream end is located axially upstream of the maximum camber point, the upstream end and the maximum camber point are separated by a distance less than or equal to 30% of the axial chord, and when the upstream end is located axially downstream of the maximum camber point, the upstream end and the maximum camber point are separated by a distance less than or equal to 20% of the axial chord.

4. The stator part according to claim 3, wherein the blade is a first blade, the stator part comprising a second blade facing the first blade, the fin being located between the first blade and the second blade, each of the first blade and the second blade comprising a leading edge and a tangent to a camber line at the leading edge, the tangents being parallel, the upstream end of the fin being located in a normal plane, the normal plane being perpendicular to the tangents, and for each tangent, the upstream end of the fin being separated from the tangent by a distance greater than or equal to 5% of the axial chord, the distance being measured in the normal plane.

5. A turbomachine comprising the stator part according to claim 1.

6. An aircraft comprising the turbomachine according to claim 5.

* * * * *